US011860950B2

(12) United States Patent
Wyle et al.

(10) Patent No.: US 11,860,950 B2
(45) Date of Patent: Jan. 2, 2024

(54) DOCUMENT MATCHING AND DATA EXTRACTION

(71) Applicant: Sureprep, LLC, Irvine, CA (US)

(72) Inventors: David A. Wyle, Corona Del Mar, CA (US); Alexander James Sadovsky, Denver, CO (US); William W. Hosek, Laguna Niguel, CA (US)

(73) Assignee: SUREPREP, LLC, Irvine, CA (US)

( * ) Notice: Subject to any disclaimer, the term of this patent is extended or adjusted under 35 U.S.C. 154(b) by 270 days.

(21) Appl. No.: 17/217,917

(22) Filed: Mar. 30, 2021

(65) Prior Publication Data

US 2022/0318315 A1 Oct. 6, 2022

(51) Int. Cl.
 *G06F 16/93* (2019.01)
 *G06N 3/08* (2023.01)
 *G06V 30/412* (2022.01)
 *G06V 30/416* (2022.01)
 *G06V 30/418* (2022.01)

(52) U.S. Cl.
 CPC ............... *G06F 16/93* (2019.01); *G06N 3/08* (2013.01); *G06V 30/412* (2022.01); *G06V 30/416* (2022.01); *G06V 30/418* (2022.01)

(58) Field of Classification Search
 None
 See application file for complete search history.

(56) References Cited

U.S. PATENT DOCUMENTS 3,963,910 A 6/1976 Enomoto et al.
4,754,326 A 6/1988 Kram et al.
5,054,096 A 10/1991 Beizer
5,144,115 A 9/1992 Yoshida
5,404,294 A 4/1995 Karnik
5,737,599 A 4/1998 Rowe et al.
5,787,295 A 7/1998 Nakao
5,848,426 A 12/1998 Wang et al.
(Continued)

OTHER PUBLICATIONS

USPTO; Non-Final Office Action dated Sep. 22, 2022 in U.S. Appl. No. 17/557,574.

(Continued)

*Primary Examiner* — Michelle M Entezari
(74) *Attorney, Agent, or Firm* — SNELL & WILMER L.L.P.

(57) ABSTRACT

The system is configured to create a generalized document automation framework that captures relevant data from documents based upon replicating historical human actions associated with a document. The system may use machine vision and natural language processing to match a new document to a document that was already human extracted in an existing corpus. This is accomplished by comparing both visual elements and textual elements. This match can be verified by statistical approaches by comparing the match metrics across multiple documents. After the match has been found and verified, the system then uses the historical extractions from the historical document and maps the extractions to similar regions in the new document based upon again both visual and text commonalities between documents. Data is then extracted from these regions of interest in the new document, sanity checked for data integrity against historical data, and then passed downstream for processing.

20 Claims, 5 Drawing Sheets

(56) References Cited

U.S. PATENT DOCUMENTS

| | | |
|---|---|---|
| 5,878,215 A | 3/1999 | Kling et al. |
| 5,881,381 A | 3/1999 | Yamashita |
| 5,923,842 A | 7/1999 | Pedersen et al. |
| 5,940,811 A | 8/1999 | Norris |
| 5,963,659 A | 10/1999 | Cahill et al. |
| 5,963,926 A | 10/1999 | Kumomura |
| 6,003,019 A | 12/1999 | Eaton et al. |
| 6,009,442 A | 12/1999 | Chen et al. |
| 6,012,050 A | 1/2000 | Eaton et al. |
| 6,021,400 A | 2/2000 | Gallacher et al. |
| 6,128,633 A | 10/2000 | Michelman et al. |
| 6,144,380 A | 11/2000 | Shwarts et al. |
| 6,167,370 A | 12/2000 | Tsourikov |
| 6,173,285 B1 | 1/2001 | Nishita et al. |
| 6,202,052 B1 | 3/2001 | Miller |
| 6,209,095 B1 | 3/2001 | Anderson et al. |
| 6,226,752 B1 | 5/2001 | Gupta et al. |
| 6,237,011 B1 | 5/2001 | Ferguson et al. |
| 6,272,484 B1 | 8/2001 | Martin et al. |
| 6,298,357 B1 | 10/2001 | Wexler et al. |
| 6,311,165 B1 | 10/2001 | Coutts et al. |
| 6,327,574 B1* | 12/2001 | Kramer .............. G06Q 30/0613 705/14.66 |
| 6,338,138 B1 | 1/2002 | Raduchel et al. |
| 6,369,811 B1 | 4/2002 | Graham et al. |
| 6,473,741 B1 | 10/2002 | Baker |
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 | 4/2004 | Blossman et al. |
| 6,912,508 B1 | 6/2005 | McCalden et al. |
| 6,957,384 B2 | 10/2005 | Jeffery et al. |
| 7,013,045 B2 | 3/2006 | Sommer et al. |
| 7,155,404 B1 | 12/2006 | Johnson et al. |
| 7,171,615 B2 | 1/2007 | Jensen et al. |
| 7,234,103 B1 | 6/2007 | Regan |
| 7,257,553 B1 | 8/2007 | Baker |
| 7,529,408 B2 | 5/2009 | Vohariwatt et al. |
| 7,565,312 B1 | 7/2009 | Shaw et al. |
| 7,570,842 B2 | 8/2009 | Suenaga et al. |
| 7,584,884 B2 | 9/2009 | Fox et al. |
| 7,590,572 B2 | 9/2009 | Larson |
| 7,647,258 B2 | 1/2010 | William et al. |
| 7,660,988 B2 | 2/2010 | Carmichael et al. |
| 7,742,958 B1 | 6/2010 | Leek |
| 7,747,484 B2 | 6/2010 | Stanley et al. |
| 7,752,092 B1 | 7/2010 | Mattice |
| 7,836,394 B2 | 11/2010 | Linder |
| 7,840,891 B1 | 11/2010 | Yu et al. |
| 7,853,494 B2 | 12/2010 | Wyle |
| 7,930,226 B1 | 4/2011 | Quinn |
| 7,930,642 B1 | 4/2011 | Gerde |
| 8,050,451 B2 | 11/2011 | Brundage et al. |
| 8,233,751 B2 | 7/2012 | Patel |
| 8,351,703 B2 | 1/2013 | Jain et al. |
| 8,388,440 B2 | 3/2013 | Patterson |
| 8,392,472 B1 | 3/2013 | Gupta et al. |
| 8,417,597 B1 | 4/2013 | McVickar |
| 8,520,885 B2 | 8/2013 | Tanabe |
| 8,606,665 B1 | 12/2013 | Shaw |
| 8,676,689 B1 | 3/2014 | Whelan |
| 9,350,599 B1 | 5/2016 | Enright |
| 9,558,521 B1 | 1/2017 | Eftekhari |
| 9,672,487 B1 | 6/2017 | Garcia |
| 10,210,580 B1 | 2/2019 | Paulus et al. |
| 10,229,314 B1 | 3/2019 | Mitchell |
| RE47,533 E | 7/2019 | Bartlett |
| 10,339,527 B1 | 7/2019 | Coleman et al. |
| 10,482,170 B2 | 11/2019 | Roebuck et al. |
| 10,489,645 B2 | 11/2019 | Wyle |
| 10,592,994 B1 | 3/2020 | Mishra |
| 10,621,678 B1 | 5/2020 | Zafar |
| 10,664,819 B1 | 5/2020 | Zafar |
| 11,049,235 B2* | 6/2021 | Wheaton ................ G06F 16/93 |
| 2001/0037268 A1 | 11/2001 | Miller |
| 2001/0044762 A1 | 11/2001 | Nault |
| 2002/0037097 A1 | 3/2002 | Hoyos |
| 2002/0111888 A1 | 8/2002 | Stanley et al. |
| 2002/0133410 A1 | 9/2002 | Hermreck et al. |
| 2002/0161698 A1 | 10/2002 | Wical |
| 2002/0161796 A1 | 10/2002 | Sylthe |
| 2002/0184125 A1 | 12/2002 | Cirulli et al. |
| 2003/0036912 A1 | 2/2003 | Sobotta et al. |
| 2003/0046112 A1 | 3/2003 | Dutta |
| 2003/0061131 A1 | 3/2003 | Parkan, Jr. |
| 2003/0163547 A1 | 8/2003 | Beisty et al. |
| 2003/0231344 A1 | 12/2003 | Fast |
| 2003/0233296 A1 | 12/2003 | Wagner |
| 2004/0024665 A1 | 2/2004 | Foster |
| 2004/0030702 A1 | 2/2004 | Houston |
| 2004/0078271 A1 | 4/2004 | Morano et al. |
| 2004/0088233 A1 | 5/2004 | Brady et al. |
| 2004/0150854 A1 | 8/2004 | Sprague et al. |
| 2004/0216057 A1 | 10/2004 | Wayle et al. |
| 2004/0225581 A1 | 11/2004 | Wyle et al. |
| 2004/0243626 A1 | 12/2004 | Wyle et al. |
| 2005/0038722 A1 | 2/2005 | Throndson et al. |
| 2005/0060234 A1 | 3/2005 | Reahard |
| 2005/0065852 A1 | 3/2005 | Bross et al. |
| 2005/0102283 A1 | 5/2005 | Anderson et al. |
| 2005/0131805 A1* | 6/2005 | Bross .................... G06Q 40/02 705/39 |
| 2006/0026083 A1 | 2/2006 | Wyle |
| 2006/0026086 A1 | 2/2006 | Jim |
| 2006/0028520 A1 | 2/2006 | Vonwiller et al. |
| 2006/0107206 A1 | 5/2006 | Koskimies |
| 2006/0155618 A1 | 7/2006 | Wyle |
| 2006/0178961 A1 | 8/2006 | Stanley et al. |
| 2006/0180650 A1 | 8/2006 | Claessens et al. |
| 2006/0271519 A1 | 11/2006 | Blackwood |
| 2007/0033118 A1 | 2/2007 | Hopkinson |
| 2007/0250392 A1 | 10/2007 | Paulsen et al. |
| 2007/0250418 A1 | 10/2007 | Banks et al. |
| 2007/0271249 A1 | 11/2007 | Cragun et al. |
| 2008/0005024 A1* | 1/2008 | Kirkwood ............. G06Q 10/00 705/50 |
| 2008/0077503 A1 | 3/2008 | Zias et al. |
| 2008/0082432 A1 | 4/2008 | Baker |
| 2008/0120129 A1 | 5/2008 | Seubert et al. |
| 2008/0147494 A1 | 6/2008 | Larson |
| 2008/0189197 A1 | 8/2008 | Allanson et al. |
| 2008/0228714 A1 | 9/2008 | Prager et al. |
| 2008/0263370 A1 | 10/2008 | Hammoutene |
| 2008/0319882 A1 | 12/2008 | Wyle |
| 2010/0074509 A1 | 3/2010 | Laaser et al. |
| 2010/0161460 A1 | 6/2010 | Vroom et al. |
| 2011/0255789 A1* | 10/2011 | Neogi .................... G06V 30/40 382/190 |
| 2012/0084185 A1 | 4/2012 | Ciaramitaro et al. |
| 2012/0109792 A1 | 5/2012 | Eftekhari et al. |
| 2012/0173655 A1 | 7/2012 | McEntee |
| 2012/0219175 A1 | 8/2012 | Richardson et al. |
| 2012/0331005 A1 | 12/2012 | White |
| 2013/0103729 A1* | 4/2013 | Cooney ................ G06F 16/252 707/831 |
| 2013/0204840 A1 | 8/2013 | Jarvis et al. |
| 2014/0161365 A1 | 6/2014 | Acharya |
| 2014/0172656 A1 | 6/2014 | Shaw |
| 2014/0180883 A1 | 6/2014 | Regan |
| 2014/0201126 A1* | 7/2014 | Zadeh .................... A61B 5/165 706/52 |
| 2014/0214758 A1* | 7/2014 | Tripathi ................ G06F 16/93 707/608 |
| 2015/0178856 A1 | 6/2015 | Flores |
| 2015/0205921 A1 | 7/2015 | Dick |
| 2016/0055376 A1 | 2/2016 | Koduru |

(56) References Cited

U.S. PATENT DOCUMENTS

| | | | |
|---|---|---|---|
| 2016/0328438 A1 | 11/2016 | Bacalzo | |
| 2017/0011051 A1* | 1/2017 | Specht | G06F 16/93 |
| 2017/0178199 A1 | 6/2017 | Cessna | |
| 2017/0279733 A1 | 9/2017 | Marshall | |
| 2017/0286414 A1 | 10/2017 | Roebuck | |
| 2018/0018312 A1* | 1/2018 | Guzman | G06F 16/93 |
| 2018/0033092 A1 | 2/2018 | Wang et al. | |
| 2018/0113945 A1 | 4/2018 | Dhillon | |
| 2019/0114313 A1 | 4/2019 | Roebuck | |
| 2019/0172153 A1* | 6/2019 | Wyle | G06Q 20/14 |
| 2019/0320113 A1* | 10/2019 | Rajvanshi | H04N 23/64 |
| 2020/0065218 A1* | 2/2020 | Bhosale | G06F 11/366 |
| 2020/0233938 A1 | 7/2020 | Sirianni | |
| 2020/0236224 A1* | 7/2020 | Harbinson | G06V 30/2253 |
| 2021/0090174 A1* | 3/2021 | Altfest | G06Q 40/10 |
| 2021/0124919 A1* | 4/2021 | Balakrishnan | G06V 30/40 |
| 2022/0319143 A1 | 10/2022 | Wyle et al. | |

OTHER PUBLICATIONS

USPTO; Notice of Allowance dated Nov. 17, 2022 in U.S. Appl. No. 15/832,649.
USPTO; Corrected Notice of Allowability dated Dec. 7, 2022 in U.S. Appl. No. 15/832,649.
USPTO, Final Office Action dated Apr. 6, 2022 in U.S. Appl. No. 15/832,649.
USPTO, Advisory Action dated May 9, 2022 in U.S. Appl. No. 15/832,649.
USPTO; Non-Final Office Action dated Feb. 21, 2018 in U.S. Appl. No. 15/832,587.
USPTO; Final Office Action dated Aug. 6, 2018 in U.S. Appl. No. 15/832,587.
USPTO; Non-Final Office Action dated Apr. 10, 2019 in U.S. Appl. No. 15/832,587.
USPTO; Final Office Action dated Sep. 11, 2019 in U.S. Appl. No. 15/832,587.
USPTO; Restriction Requirement dated Oct. 2, 2019 in U.S. Appl. No. 15/832,625.
USPTO; Non-Final Office Action dated Nov. 4, 2019 in U.S. Appl. No. 15/832,649.
USPTO; Non-Final Office Action dated Nov. 18, 2019 in U.S. Appl. No. 15/832,640.
USPTO; Non-Final Office Action dated Mar. 12, 2020 in U.S. Appl. No. 15/832,587.
USPTO; Non-Final Office Action dated Feb. 19, 2020 in U.S. Appl. No. 15/832,625.
USPTO; Final Office Action dated Mar. 17, 2020 in U.S. Appl. No. 15/832,649.
USPTO; Final Office Action dated May 29, 2020 in U.S. Appl. No. 15/832,640.
USPTO; Final Office Action dated Jul. 24, 2020 in U.S. Appl. No. 15/832,625.
USPTO; Non-Final Office Action dated Aug. 19, 2020 in U.S. Appl. No. 15/832,625.
USPTO; Final Office Action dated Sep. 29, 2020 in U.S. Appl. No. 15/832,587.
USPTO; Advisory Action dated Oct. 26, 2020 in U.S. Appl. No. 15/832,587.
USPTO; Final Office Action dated Nov. 16, 2020 in U.S. Appl. No. 15/832,625.
USPTO; Non-Final Office Action dated Jan. 1, 2021 in U.S. Appl. No. 15/832,587.
USPTO; Non-Final Office Action dated Jan. 4, 2021 in U.S. Appl. No. 15/832,640.
USPTO; Advisory Action dated Jan. 14, 2021 in U.S. Appl. No. 15/832,625.
USPTO; Non-Final Office Action dated Feb. 3, 2021 in U.S. Appl. No. 15/832,649.
USPTO; Non-Final Action dated Feb. 25, 2021 in U.S. Appl. No. 15/832,625.
USPTO; Final Office Action dated May 25, 2021 in U.S. Appl. No. 15/832,587.
USPTO; Final Office Action dated Jun. 7, 2021 in U.S. Appl. No. 15/832,640.
USPTO; Advisory Action dated Jun. 8, 2021 in U.S. Appl. No. 15/832,587.
USPTO; Final Office Action dated Jun. 15, 2021 in U.S. Appl. No. 15/832,649.
USPTO; Advisory Action dated Jul. 15, 2021 in U.S. Appl. No. 15/832,640.
USPTO; Final Action dated Jul. 26, 2021 in U.S. Appl. No. 15/832,625.
David Wyle, "Automating Tax Preparation With OCR Technology", https://www.aicpastore.com/Content/media/PRODUCER_CONTENT/Newsletters/Articles_2007/CPA/June/OCR_Technology.jsp, Jul. 16, 2007 (Year: 2007), pp. 1-7.
LPL Financial, "LPL Financial Turbotax 2015 User Guide", www.lplfinancial.com, 2015 (Year: 2015), pp. 1-17.
IRS, "Get PriorYearTax Information from the IRS", https://www.irs.gov/newsroom/get-prior-year-tax-information-from-the-irs, Mar. 1, 2017 (Year: 2017), pp. 1-2.
Rouse, Margaret, "What is Metadata", WhatIs.com, https://whatis.techtarget.com/definition/metadata, TechTarget, Nov. 23, 2017 (Year: 2017), pp. 1-2.
USPTO; Non-Final Action dated Jul. 23, 2021 in U.S. Appl. No. 16/659,193.
IntelliTax for Windows and DOS, Accounting Technology, v 18, n 9, p. 38, Oct. 2002.
Cia, Patricia. Managing Your Bookmarks & Favorites, Feb. 25, 1999, SLA, 2 pages.
Harvey, Greg. Adobe Acrobat 5 PDF For Dummies, 2002, Wiley Publishing Inc., pp. 13-34.
MSPivot, Microsoft Office Excel PivotTable Reports 101, downloaded on Sep. 14, 2008 from http://office.microsoft.com/em-us/excel/HAOI0346321033.aspx?ac= , 12 pages.
SurePrep introduces Tax prep Workflow System, Anonymous, CPA technology Advisor, Ft. Atkinson, Jun./Jul. 2005, vol. 15, Issue 3, 1 page.
Missing Links: an insider's view, Dauphinais G. Williams, PC Magazine, vol. 6, No. 15, 24 pages.
Ted Needleman, Accounting Today, New York, Aug. 1998, vol. 12, Iss. 14, p. 24, 4 pgs.
USPTO, Restriction/Election Requirement dated Jan. 17, 2007 in U.S. Appl. No. 10/422,133.
USPTO, Non-Final Office Action dated Apr. 17, 2007 in U.S. Appl. No. 10/422,133.
USPTO, Final Office Action dated Sep. 4, 2007 in U.S. Appl. No. 10/422,133.
USPTO, Non-Final Office Action dated Nov. 14, 2007 in U.S. Appl. No. 10/422,133.
USPTO, Final Office Action dated Jun. 9, 2008 in U.S. Appl. No. 10/422,133.
USPTO, Restriction/Election Requirement dated Oct. 2, 2008 in U.S. Appl. No. 10/422,133.
USPTO, Non-Final Office Action dated May 19, 2009 in U.S. Appl. No. 10/422,133.
USPTO, Notice of Allowance dated Sep. 15, 2009 in U.S. Appl. No. 10/422,133.
USPTO, Supplemental Notice of Allowance dated Nov. 9, 2009 in U.S. Appl. No. 10/422,133.
USPTO, Non-Final Office Action dated Sep. 14, 2007 in U.S. Appl. No. 10/430,830.
USPTO, Final Office Action dated Jan. 8, 2008 in U.S. Appl. No. 10/430,830.
USPTO, Non-Final Office Action dated Jan. 13, 2009 in U.S. Appl. No. 10/430,830.
USPTO, Non-Final Office Action dated Jun. 25, 2009 in U.S. Appl. No. 10/430,830.
USPTO, Notice of Allowance dated Sep. 30, 2009 in U.S. Appl. No. 10/430,830.
USPTO, Non-Final Office Action dated Nov. 9, 2011 in U.S. Appl. No. 12/510,179.

(56) References Cited

OTHER PUBLICATIONS

USPTO, Non-Final Office Action dated Apr. 9, 2012 in U.S. Appl. No. 12/510,179.
USPTO, Notice of Allowance dated Sep. 12, 2012 in U.S. Appl. No. 12/510,179.
USPTO, Non-Final Office Action dated Feb. 25, 2008 in U.S. Appl. No. 10/448,483.
USPTO, Notice of Allowance dated Sep. 22, 2008 in U.S. Appl. No. 10/448,483.
USPTO, Restriction/Election Requirement dated Aug. 28, 2008 in U.S. Appl. No. 11/031,060.
USPTO, Non-Final Office Action dated Nov. 12, 2008 in U.S. Appl. No. 11/031,060.
USPTO, Final Office Action dated Jun. 24, 2009 in U.S. Appl. No. 11/031,060.
USPTO, Non-Final Office Action dated Oct. 27, 2009 in U.S. Appl. No. 11/031,060.
USPTO, Final Office Action dated May 3, 2010 in U.S. Appl. No. 11/031,060.
USPTO, Notice of Allowance dated Oct. 6, 2010 in U.S. Appl. No. 11/031,060.
USPTO, Non-Final Office Action dated Apr. 11, 2008 in U.S. Appl. No. 10/903,637.
USPTO, Final Office Action dated Oct. 1, 2008 in U.S. Appl. No. 10/903,637.
USPTO, Non-Final Office Action dated Mar. 16, 2009 in U.S. Appl. No. 10/903,637.
USPTO, Notice of Allowance dated Sep. 4, 2009 in U.S. Appl. No. 10/903,637.
USPTO, Non-Final Office Action dated Nov. 24, 2008 in U.S. Appl. No. 11/766,019.
USPTO, Non-Final Office Action dated May 27, 2009 in U.S. Appl. No. 11/766,019.
USPTO, Final Office Action dated Nov. 5, 2009 in U.S. Appl. No. 11/766,019.
USPTO, Notice of Allowance dated May 5, 2010 in U.S. Appl. No. 11/766,019.
USPTO, Non-Final Office Action dated Jun. 12, 2013 in U.S. Appl. No. 13/155,195.
USPTO, Final Office Action dated Jan. 16, 2014 in U.S. Appl. No. 13/155,195.
USPTO, Notice of Allowance dated Apr. 25, 2014 in U.S. Appl. No. 13/155,195.
USPTO, Non-Final Office Action dated May 23, 2016 in U.S. Appl. No. 14/325,207.
USPTO, Final Office Action dated Dec. 23, 2016 in U.S. Appl. No. 14/325,207.
USPTO, Non-Final Office Action dated Sep. 5, 2017 in U.S. Appl. No. 14/325,207.
USPTO, Notice of Allowance dated Apr. 27, 2018 in U.S. Appl. No. 14/325,207.
USPTO, Non-Final Office Action dated Mar. 28, 2013 in U.S. Appl. No. 13/243,774.
USPTO, Non-Final Office Action dated Oct. 23, 2013 in U.S. Appl. No. 13/243,774.
USPTO, Notice of Allowance dated Mar. 31, 2014 in U.S. Appl. No. 13/243,774.
USPTO, Notice of Allowance dated Oct. 29, 2013 in U.S. Appl. No. 13/542,345.
USPTO, Notice of Allowance dated Aug. 19, 2019 in U.S. Appl. No. 15/922,821.
USPTO, Corrected Notice of Allowance dated Aug. 28, 2019 in U.S. Appl. No. 15/922,821.
USPTO, Notice of Allowance dated Aug. 14, 2019 in U.S. Appl. No. 16/047,346.
USPTO, Restriction/Election Requirement dated Dec. 21, 2015 in U.S. Appl. No. 12/557,473.
USPTO, Non-Final Office Action dated Oct. 25, 2012 in U.S. Appl. No. 12/557,473.
USPTO, Non-Final Office Action dated Jun. 19, 2013 in U.S. Appl. No. 12/557,473.
USPTO, Non-Final Office Action dated Oct. 23, 2014 in U.S. Appl. No. 12/557,473.
USPTO, Non-Final Office Action dated Jun. 2, 2016 in U.S. Appl. No. 12/557,473.
USPTO, Final Office Action dated Dec. 31, 2013 in U.S. Appl. No. 12/557,473.
USPTO, Final Office Action dated May 22, 2015 in U.S. Appl. No. 12/557,473.
USPTO, Notice of Allowance dated Jun. 6, 2014 in U.S. Appl. No. 12/557,473.
International Searching Authority, International Written Opinion dated Oct. 26, 2006 in Application No. PCT/US2005/25711.
International Searching Authority, International Preliminary Report on Patentability dated Jan. 30, 20007 in Application No. PCT/US2005/25711.
International Searching Authority, International Preliminary Report on Patentability dated Jan. 30, 20007 in Application No. PCT/US2005/046397.
International Searching Authority, International Written Opinion dated Jul. 23, 2007 in Application No. PCT/US2005/046397.
USPTO, Advisory Action dated Sep. 3, 2021 in U.S. Appl. No. 15/832,649.
USPTO, Notice of Allowance dated Sep. 13, 2021 in U.S. Appl. No. 16/659,193.
USPTO, Non-Final Office Action dated Sep. 28, 2021 in U.S. Appl. No. 15/832,640.
USPTO, Non-Final Office Action dated Oct. 1, 2021 in U.S. Appl. No. 15/832,625.
USPTO, Non-Final Office Action dated Oct. 10, 2021 in U.S. Appl. No. 15/832,649.
USPTO; Non-Final Action dated Nov. 15, 2021 in U.S. Appl. No. 15/832,587.
USPTO, Final Office Action dated Dec. 15, 2021 in U.S. Appl. No. 15/832,625.
USPTO, Notice of Allowance dated Dec. 16, 2021 in U.S. Appl. No. 15/832,640.
Peasron, "Grouping and Filtering with Metadata" Managing Files and Searching in Windows 8.1. Informit. Apr. 7, 2014; <https://www.informit.com/articles/article.aspx?p=2186997 &seq Num=5> (Year: 2014), 2 pages.
USPTO, Supplemental Notice of Allowance dated Dec. 30, 2022 in U.S. Appl. No. 15/832,640.
USPTO, Advisory Action dated Feb. 24, 2022 in U.S. Appl. No. 15/832,625.
USPTO, Notice of Allowance dated Mar. 18, 2022 in U.S. Appl. No. 15/832,587.
Brian Tankersley, "Tax Document Automation Tools Come of Age", www.CPAPracticeAdviser.com Jul. 2011 (Year: 2011), pp. 21-23.
USPTO; Notice of Allowance dated May 16, 2023 in U.S. Appl. No. 17/557,574.
USPTO; Corrected Notice of Allowance dated Jun. 20, 2023 in U.S. Appl. No. 17/557,574.

* cited by examiner

Historical Document

| | |
|---|---|
| 1 Wages, tips, other compensation | 2 Federal income tax withheld |
| 228839.47 | 76836.81 |
| 3 Social security wages | 4 Social security tax withheld |
| 234367.9 | 17929.14 |
| 5 Medicare wages and tips | 6 Medicare tax withheld |
| 272320.44 | 7897.29 |
| 7 Social security tips | 8 Allocated tips |
| 234367.9 | 272320.44 |
| 9 Advance EIC payment | 10 Dependent care benefits |
| | 133 |
| 11 Nonqualified plans | 12a See instructions for box 12 |
| 202 | H  9473 |

Manually Extracted Data

Value 1   228839
Value 2   7897
Value 3   133

Novel Document

| | |
|---|---|
| 1 Wages, tips, other compensation | 2 Federal income tax withheld |
| 232742.96 | 80767.81 |
| 3 Social security wages | 4 Social security tax withheld |
| 164531.06 | 12586.63 |
| 5 Medicare wages and tips | 6 Medicare tax withheld |
| 268492.56 | 7786.28 |
| 7 Social security tips | 8 Allocated tips |
| 164531.06 | 268492.56 |
| 9 Advance EIC payment | 10 Dependent care benefits |
| | 176 |
| 11 Nonqualified plans | 12a See instructions for box 12 |
| 207 | 3391 |

Automated Extracted Data

Value 1   232743
Value 2   7786
Value 3   176

FIGURE 4

DOCUMENT MATCHING AND DATA EXTRACTION

TECHNICAL FIELD

This disclosure generally relates to document matching and data extraction, and more particularly, to a system and method for recognizing regions of interest between similar documents by comparing visual elements and textual elements.

BACKGROUND

Different types of businesses often carefully curate and extract a large volume of documents. For example, a large set of accounting documents (in the form of images and/or portable document files) are typically sent to a tax preparer, who then has the task of identifying and extracting relevant information from the accounting documents.

To provide more efficiency, businesses have tried to automate this workflow by incorporating template-based optical character recognition (OCR). Businesses have also used rigid, specific rule-based methods. For example, businesses would often perform optical character recognition to use the expected positioning of text on a document to both identify the document type and to further extract and annotate data from that document.

Templated-based OCR often includes trained humans to create each template. A human with detailed knowledge of the OCR system and document variability must review every document to specifically create sets of rules detailing exactly how to extract data from each of the documents. Templated-based OCR also usually requires trained humans to maintain each template. However, templates often degrade in performance as documents change. While some variability can be explicitly declared in the template, any unaccounted-for changes usually require humans to modify a template to account for the differences or to create a new template.

Moreover, templated-based OCR approaches typically cannot adapt to dynamic documents. In particular, some documents may be structured, but the documents have variability in table length and data positioning. While a human is often able to detect these similar regions of interest from document to document, it is extremely difficult to create generic rules/templates that are able to capture these regions and specify how to process the regions.

Furthermore, resource constraints usually exist in template creation. For an organization that may process millions of documents, the cost/benefit tradeoff required for spending the time and money to create a templated-based OCR may not be sufficient to automate the analysis of documents that appear infrequently. Instead, these documents are typically curated by hand each time the documents are encountered.

Therefore, a long-felt need exists for a way to turn such hand curation into automation via artificial intelligence approaches that do not require human interaction.

SUMMARY

A system and method are disclosed for recognizing and extracting relevant data from regions of interest between similar documents by comparing visual elements and textual elements. In various embodiments, the system may include receiving, by a processor, a new document having second content and regions of interest; comparing, by the processor, the second content of the new document to first content in one or more of a plurality of historical documents; creating, by the processor, match metrics for each of the one or more of a plurality of historical documents, wherein the match metrics are based on the comparing; verifying, by the processor, the comparing by comparing the match metrics across the plurality of historical documents; extracting, by the processor, the second content from the regions of interest in the new document; checking, by the processor, the integrity of the second content in the new document against the first content in the one or more of a plurality of historical documents; and transmitting, by the processor, the second content to a document processing system.

The comparing may be based on at least one of visual elements or textual elements. The receiving may be via at least one of an image or a PDF. The verifying may be based on statistical properties of the match of the new document compared to population statistics of the plurality of historical documents. The comparing may further comprise comparing at least one of text headers, text values, X-Y coordinate positioning or visual elements. The method may further comprise transmitting, by the processor, the new document with the second content to a human for verification, in response to the checking the integrity of the second content in the new document being a failure.

The comparing may further comprise comparing at least one of visual elements or textual elements. The comparing may further comprise comparing at least one of logos, fonts, lines or layouts. The comparing may further comprise comparing text from at least one of headers, values or tables. The comparing may be accomplished by at least one of location un-aware OCR detected text or visual document similarity indexing. The comparing may further comprise detecting, by the processor, raw text of the second content in the new document. The comparing may further comprise detecting, by the processor, tables of the second content in the new document. The comparing may further comprise pulling, by the processor, at least one of headers or text values from raw text of the second content in the new document. The comparing may further comprise pulling, by the processor, at least one of headers or text values from raw text of the second content in the new document, based on at least one of proximity or formatting. The comparing may further comprise detecting, by the processor, raw text of the first content in the historical document. The comparing may further comprise detecting, by the processor, tables of the first content in the historical document. The comparing may further comprise pulling, by the processor, at least one of headers or text values from raw text of the first content in the historical document. The comparing may further comprise pulling, by the processor, at least one of headers or text values from raw text of the first content in the historical document, based on at least one of proximity or formatting. The comparing may further comprise comparing, by the processor, visual elements between the new document and the historical document. The comparing may further comprise comparing, by the processor, visual elements between the new document and the historical document using at least one of mean square error (MSE), a structural similarity index measure (SSIM) or an image similarity metric as determined by a deep neural network.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings:

FIG. 4 is an exemplary data extraction and classification using the detected regions of interest, in accordance with various embodiments.

DETAILED DESCRIPTION

Figure 5:
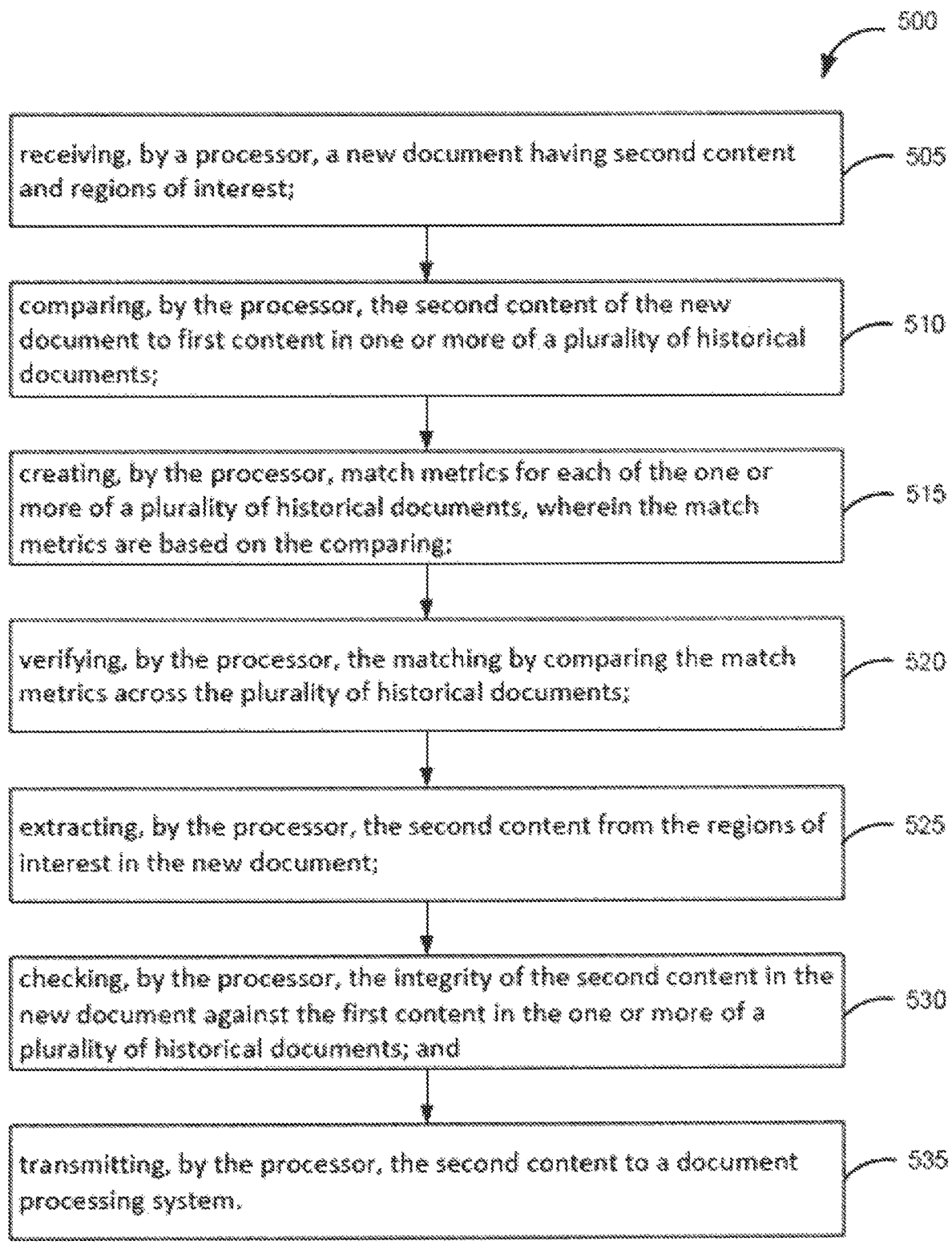
FIG. 5 is an exemplary flow chart showing the method, in accordance with various embodiments.

The system directly removes the need for human maintained and rigid OCR templates by creating a dynamic, data extraction platform based around the ability to recognize regions of interest between similar documents. In various embodiments, the system is configured to create a generalized document automation framework that captures relevant data from documents based upon replicating historical human actions associated with a document. In general, in various embodiments and with respect to FIG. 5, the system may receive a new document having second content and regions of interest (step 505). The system may use machine vision and natural language processing to compare the new document (e.g., current year tax form) to an historical document (e.g., prior year tax form) (step 510). The historical document may have already been subject to human data extraction in an existing corpus. This is accomplished by comparing visual elements (e.g., logos, fonts, lines, and layout), and textual elements (e.g., text contained in headers, values, and tables on the document). The system may create match metrics for each of the one or more of a plurality of historical documents, wherein the match metrics are based on the comparing (step 515). The system reviews the historical documents and maps the extractions of first content to similar regions in the new document based upon both visual and text commonalities between documents. As used herein, a "match" may include an identical match, a partial match, a correlation, similar content, similar layout, etc. This match can be verified by statistical approaches by comparing the match metrics across multiple documents (step 520). After the match has been found and verified, in various embodiments, the system extracts the second content from the new document (step 525). In various embodiments, the data may also be extracted from these regions of interest in the new document, sanity checked for data integrity against historical data (step 530), and then transmitted downstream for processing (step 535). The further processing may be conducted by a document processing system. The document processing system may process any items that are generated periodically. The items may include, for example, healthcare forms, billing forms, invoicing forms, audit forms, utility invoices, etc. Any system that uses multiple sources of documents. The system may also apply extraction of data in these regions, along with adapting and carrying forward historically human defined rules, to fully automate extraction in the new document.

The system is document agnostic in that the system provides a fuzzy mapping between historical document extractions and new documents. For near identical documents, the system may provide perfect fidelity in extraction. For a new document that is changed from an historical document, the fidelity of the approach is entirely focused on the ability to accurately determine the mapping between extractions from the historical document and corresponding regions of interest in the new document. However, due to multiple steps of verification, if a match cannot be made, regions of interest cannot be found or extracted data is different (e.g., different in expected format or type), the system can default to human extraction. Traditional templated OCR systems include human verification for uncertain values. This system is better than templated OCR because this system can handle document types that have traditionally defied template-based OCR. For example, with the automation of property tax documents, a template-based system would require the creation and maintenance of 3000+ variations, one for each of the numerous US counties.

More specifically, in various embodiments, the system may create a database of historical documents by analyzing each of the historical documents. The historical documents may be analyzed by acquiring regions of interest (e.g., coordinates) of certain fields, logos, shapes, lines, labels or other objects, obtaining target data types and/or using known key-value pairs. In various embodiments, such factors are initially obtained in a user-driven process that results in annotated documents, as further described below. The historical documents may also be analyzed or annotated by a human user, but the human user only needs to annotate the historical document once, then the historical document can be used many times to compare to various new documents.

While other systems may try to determine the type of new document by comparing to a limited set of known document types, this system creates a database of many historical documents that are used to identify a new document. For example, each county in the U.S. may include a different property tax form, so it would be almost impossible to have a database of every type of property tax form. Thus, this system compares the new property tax form from this year to historical property tax forms in prior years that may have included the same format. For example, a taxpayer that previously submitted the prior year property tax form may live in the same county as a different taxpayer that submitted the new property tax form this year, so the system may recognize the new property tax form as matching the historical property tax form from last year. As such, the system may compare forms from the same taxpayer or from different taxpayers.

Moreover, the system goes beyond just identifying tax documents because the system identifies particular types of tax documents. For example, the system may not only recognize that an historical document is a W-2 tax document, but the system may also recognize that the historical document is a W-2 tax document from a particular employer (e.g., a Burger King W-2) and/or for a particular employee.

The system receives a new document. The new document may be in the form of an electronic document such as, for example, an image, a photo, a scan, spreadsheets (e.g., MS Excel), written documents (e.g., MS Word or emails) and/or a portable document format (PDF). The system may load the new document for comparison against an historical text corpus of the historical documents. The new documents may be processed by an automated back-end workflow. In various embodiments, an exemplary workflow may include multiple steps of autonomous functionality that ingests documents, processes documents, performs data transforms, and delivers the output. In the course of this processing, the new document is automatically sent for storage to a file system (e.g., a cloud based system) and/or may be sent to one or more systems for further processing. The new document is compared against the historical documents. Historical documents may be stored in raw text/PDF formats. However, to improve speed of computation, cached metadata about the historical document may be stored in a relational database. To optimize computation, the first time an historical document is chosen as a candidate for comparison, the extraction algorithm extracts and stores the information that is contained in the historical document such as, for example, text, key-value pairs, named entities, etc. If the historical document is used in future comparisons, the extracted information can be used directly for comparison rather than needing to repeat the extraction process each time.

The new document may be compared against a subset or all of the candidate historical documents in a corpus. For example, the system may determine a subset by selecting only the historical documents that include a certain taxpayer's name. In that regard, by reducing the set of historical documents to a subset or by not needing to include a large set of all existing types of forms, the system is able to reduce processing time and conserve processing resources. Moreover, selecting a subset of historical documents also increases the accuracy of the results because the subset includes more relevant historical documents (e.g., only documents from the same taxpayer). While the process may operate on any computer, due to the computational power needed, the process may scale to high end server/cloud computing. Additionally, in various embodiments, many of the algorithms may be accelerated further via the use of Graphics Processing Units (GPUs).

The comparing may be conducted by any process such as, for example, being based on the location un-aware OCR detected text on the new document and/or visual document similarity indexing. With respect to the location un-aware OCR detected text, the image may be pre-processed to remove scanning noise. The pre-processing may include fixing any rotation/skew that may have been applied to the document, and using high and low pass filters to remove digital noise in the brightness/contrast of the page. In comparison to traditional templated OCR approaches, the software then scans a document in search of sequences of characters in a specific language subset (e.g., English) to form words. The detected characters, words, and their exact X,Y location in the document are then extracted and stored or processed, as further described below. Alternative or in tandem to the OCR approach, the process may look at the pixel information contained in a PDF to find image elements (e.g., motifs) that can be compared, as further described below.

The system may also conduct the comparison by using identification algorithms such as, for example, machine learning, artificial intelligence, expert systems logic, key-value pair matching (e.g., matching labels next to certain data), bag-of-words and/or identifier schema (e.g., matching W-2 from a particular employer).

More specifically, with respect to machine learning, the system may use specifically supervised learning to compute the probability of two pages being similar or the same. The document may be decomposed into features, which could be any content elements, specific words, visual logos or motifs, the presence of specific fonts, absence or presence of text at different coordinates, or any other element that can be observed from the document. These features may then be used to predict an outcome such as similarity probability. A model can be trained by looking at historical pairs of documents using those features to predict the outcome.

With respect to artificial intelligence/expert systems logic, the artificial intelligence approaches (e.g., expert systems) uses a long list of IF/THEN logic based upon business rules unique to documents. For example, IF the headers of two documents match, AND there is a unique identifier on both documents, they are the same document. With respect to key/value pair matching, an initial scan is completed on the document to determine headers (keys) and corresponding values (field data). For example, on a form, there could be the word "Name:" in bold as a key, next to the value "John" in regular text. This pattern could be repeated for other keys (address, zip code, etc.) throughout the form. Recognizing this pattern, and then extracting data in this way allows for every document to be recomposed into its corresponding key/value pairs. To determine document matches, the system may compare the overlap between keys in two documents, values in two documents, or a combination.

With respect to bag of words, documents are scanned for any text. The overlap between all text extracted between two documents is then compared. With respect to identifier schema, to uniquely identify a document, a set of data points (identifiers) are defined in a data dictionary. Depending on the document type, up to five identifiers may be used to uniquely identify a document, although there is no technical limit to the number of identifiers that can be defined. An example of identifier usage would be a W-2 document that includes two identifiers: an employer ID (EIN) and an employee ID (SSN).

Figure 1:
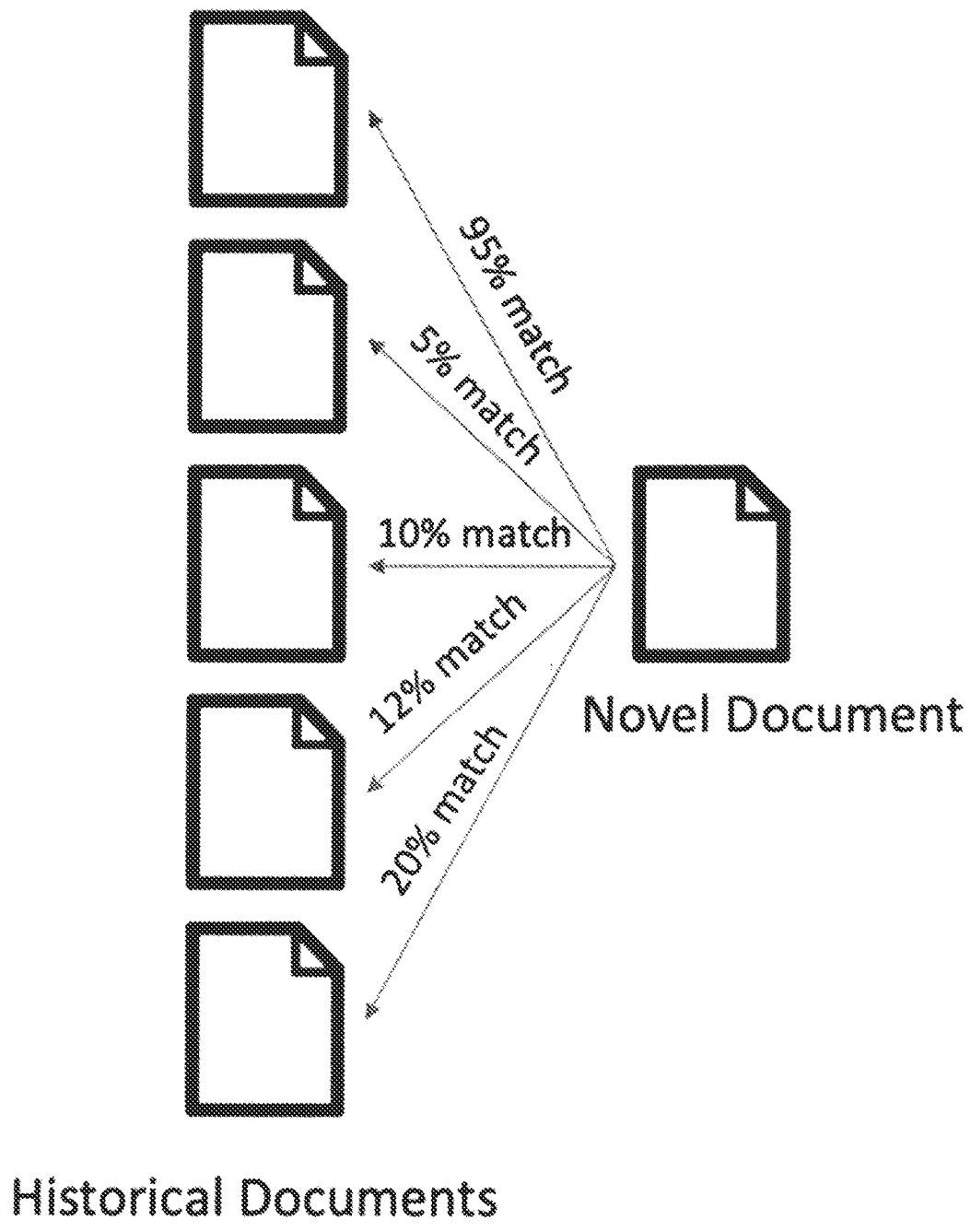
FIG. 1 is an exemplary graphic showing matching scores based on historical matching with a new document, in accordance with various embodiments.

As set forth in FIG. 1, in various embodiments, the system determines a match score based on the comparison. The match score may be based on the percentage of content that may match between the historical documents and the new document. The content may include, for example, words, characters, headers, numbers, values, symbols, data, information, metadata, regions of interest, visual elements, textual elements, logos, fonts, lines, layouts, headers, values, tables or other content. Percentage overlap may be determined by taking the Jaccardian distance between the two documents. In particular, the number of words that the documents share divided by the total number of words between both documents. As used herein, the term "match" may include identical match, substantial match, items being similar, match to a certain threshold, match based on an algorithm and/or the like. The system may also incorporate any other match metrics such as, for example, computer vision score, etc.

Figure 2:
FIG. 2 is an exemplary non-templated text comparison, in accordance with various embodiments.

As set forth in FIG. 2, in various embodiments, the system may conduct non-templated text comparison. The system may detect a subset or all of the raw text on the new document. Based upon proximity and formatting, the headers and text values are pulled from this new document raw text by, for example, implementing deep-learning, rule or natural language based relation extraction algorithms (e.g., non-exhaustive survey can be found at www.arxiv.org/pdf/2011.13534.pdf, which is hereby incorporated by reference). In addition, the system may identify any tables in the new document. The system may place the raw text from the new document in its context as well. Any text that is not part of a table or identified link to a header may be referred to as raw text. Raw text may be noted by its X, Y location on the document, and may be fed through an NLP algorithm for named entity recognition to see if it can be determined to be of a specific known entity (Dollar amount, Social Security Number, Address, etc.). The system may detect a subset or all of the raw text on the historical document. Based upon proximity and formatting, the headers and text values are pulled from this historical document raw text, as set forth above. In addition, the system may identify any tables in the historical document. The system may place the raw text from the historical document in their context as well, as set forth above. The system may conduct pairwise comparisons between similar regions of interest in the new and historical documents to identify areas of overlap and difference. Comparisons may be conducted by matching headers and corresponding text values between both documents. If headers cannot be found, then X,Y locations of nearest text is found between documents and comparisons are made. In addition, the entity of the text, if known, may be used to make equal comparisons in these cases as well. Such a process may be algorithmic.

In various embodiments, the system may conduct non-templated machine vision comparison (e.g., visual document similarity indexing). The system may attempt to match visual elements in the new document to visual elements in a subset or all of the historical documents in the corpus. For example, the logos may be similar, the layout may be similar and/or the font may be similar. The system may capture the result of these matches holistically via, for example, mean square error (MSE), a structural similarity index measure (SSIM), and/or an image similarity metric as determined by a deep neural network. Each of these algorithms may be applied to determine a match by determining a metric score for each metric. For MSE, this is obtained by going through each corresponding pixel of each image and calculating the difference between grayscale pixel intensities in each image. The system squares those differences, adds them, and divides by total number of pixels in the image. For SSIM, the system applies the method by Wang, et. al (www.cns.nyu.edu./pub/eero/wang03-reprint.pdf, which is hereby incorporated by reference). For deep learning, the system may train a decision network on known examples of matching and non-matching images to give a similarity score between any two images or may make use of "Siamese" networks or their variants. (www.proceedings.neurips.cc/paper/1993/file/288cc0ff022877bd3df94bc9360bc5d-.Paper.pdf). All of these approaches may output a score metric.

If the system finds an historical document or subset of historical documents that match the new document, in various embodiments, the automated system continues the matching process. The match may be based on a certain threshold percentage of matching items. If the system does not find a match, the system determines that a user should be consulted, so the system may notify a user or send the new document to a user. The user may then annotate the new document without using the automation features such that the system may more easily recognize the document. This is a user-interface-driven process in which the end-user identifies one or more data-points on a document and then inputs a value for each of those data points. For example, the end-user may identify an item on a document to be a property-tax payment, and then enter the amount of that payment. The user may annotate the new document by using a mouse to select and identify specific regions on the document and a keyboard to enter corresponding values, with the result being organized, labeled, tabular data extraction. This annotation process may provide the foundation and substrate for future use of the above automation process. Moreover, the system may still perform the above automated features on any additional new documents that are subsequently received by the system. As such, the system or the user may annotate or recognize regions of interest of the new document such that, in the next year, the new document is now a candidate historical document that is already annotated and can be more easily identified.

Figure 3:
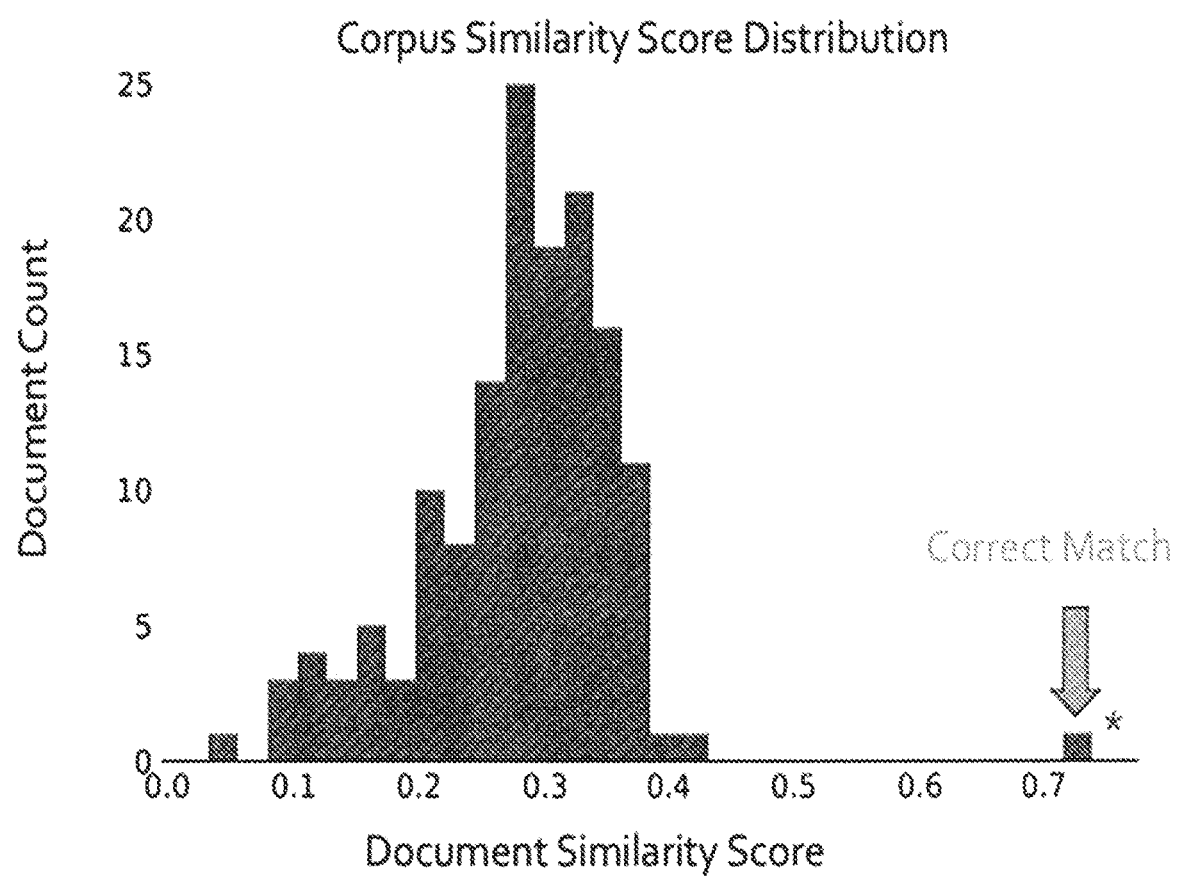
FIG. 3 is an exemplary document match verification, in accordance with various embodiments.

As set forth in FIG. 3, in various embodiments, the system may also verify the match. The system may verify the match by understanding the statistical properties of the match of any particular new document compared to the historical document corpus population statistics. To determine a match, these metrics are applied to all possible matches. The scores are then compiled as a population, and a positive metric outlier is attempted to be detected. There should be two centers of mass in the distribution, one of non-matches and one outlier which is the true match. This can be completed on known match distribution to help "tune" the accuracy of what metric is determined to be a match. For example, historically, the system may know that any metric about "0.9" is 100% a match with this data. In that case, the system may make the match threshold for a document anything that is 0.9 or higher. The system may also use matching algorithms such as, for example, machine learning, artificial intelligence, expert systems logic, key-value pair matching, bag-of-words and/or identifier schema (as explained in more detail above).

In response to matching the new document with the historical document, as set forth in FIG. 4, in various embodiments, the system may extract the data from the historical document. The data is not just acquired, but the data is also classified such that the data has more meaning. All or any subset of data points in the system may be classified by way of a comprehensive data dictionary which describes all relevant features of any given data point. The system may map extractions from a region of interest in the historical document to regions of interest in the new document. The system may detect a region of interest in the new document. For example, the system may compare text headers, text values, XY coordinate positioning, visual elements, target data types and/or known key-value matching between the new document and the historical document to automatically match corresponding regions of interest between the new document and the historical document. With respect to text headers, many regions are identified by a descriptive label (e.g., "Box 12"). With respect to XY coordinates, for documents with fixed formats year-to-year, prior-year XY coordinates can be used to identify the corresponding current-year region. With respect to visual elements, items such as logos, lines, boxes and other geometric shapes can indicate regions of interest via proximity. With respect to key-value pairs, when the keys of key-value pairs can be matched between prior-year and current-year documents, the corresponding XY coordinates of the key-value pair in the prior year can determine the region of interest for the current year. The system may use the detected regions of interest in the new document to establish the new document as a new, dynamic OCR template, such that the system can extract data from the new document using the template as a guide to find the specific data. More specifically, for each comparing (or mapping) between the historical document and the new document, in the new document, OCR is performed on the defined regions identified in the mapping. For example, if there was a mapping in the upper left of a document that found the field "Name", and it was determined that area of interest is now in the lower right of the new document, when the field "Name" is needed in the new document, it will be extracted in the lower right but treated as equal to the historical field.

In various embodiments, the system may conduct data verification. The system may verify the extracted data by automatically identifying and comparing the entry in the new document (name, address, SSN, currency, number, etc.) to the entry extracted from the historical document. For improving the data accuracy, the system may also use accuracy algorithms such as, for example, machine learning, artificial intelligence, expert systems logic, fuzzy text matching and/or text layer extraction. These algorithms may be domain specific. For example, in accounting, one may have prior knowledge that certain numbers on a form are related (sum of a column being a total, differences being taken, etc.) and this logic can be applied to verify that extracted data is accurate. Similarly, machine learning or fuzzy logic can confirm that values are within expected ranges. For example, someone making $80,000 a year is unlikely to have $2,000,000 in stock dividends and that data should be flagged for review. In fact, the exact numbers and ranges for flagging can be found using population statistics from known forms. Text layer extraction may be a special case, where the text layer of the PDF (if it exists) is extracted to see if it is in concordance with the scanned value. For more information related to text layer extraction, see U.S. patent application Ser. No. 16/047,346, entitled "System and Method for Automatic Detection and Verification of Optical Character Recognition Data," filed Jul. 27, 2018 and U.S. patent application Ser. No. 15/922,821 entitled "System and Method for Automatic Detection and Verification of Optical Character Recognition Data," filed Mar. 15, 2018, the contents of which are herein incorporated by reference in their entirety for all purposes. If the system determines that the extracted data from the historical document does not match the data in the new document, the system determines that a user should be consulted. For example, the system may determine that the extracted data from the historical document does not match the data in the new document because headers do not match, entity type does not match, key known elements from the document are missing (as discovered via an expert systems/explicit check). The system may pass the extracted data to the user for verification.

In response to the system or user verifying the extracted data, in various embodiments, the system may categorize the extracted, auto-verified data in the same way in the new document as it was classified in the historical document. As mentioned above, all or any subset of data points in the system may be classified by way of a comprehensive data dictionary which describes all relevant features of any given data point. The system may run the categorized data through various processes. For example, in the context specifically of tax automation, the categorized data from the new document may be automatically processed by tax preparation software. In the realm of invoice automation, whatever actions were taken on an historical invoice (or data that was captured and transferred to other systems), can be repeated on new documents.

The system may review the new document and historical document within overlapping windows of a graphical user interface. The new document may be within a first window and the historical document with historical extractions in a second window that overlaps with the first window. The system may dynamically relocate the textual information and/or historical extractions within the first window displayed within the graphical user interface based upon a detected overlap condition. The relocation may be based upon visual elements (logos, fonts, lines, and layout), and textual elements (the text contained in headers, values, and tables on the document). When the windows overlap, textual information and/or historical extractions are reformatted and relocated to an unobscured portion of the underlying second window. The system may determine that the textual information and/or historical extractions are too large to fit in the unobscured portion of the underlying second window. In response to being too large, the system may scale the textual information and/or historical extractions based upon a calculated scaling factor. The system may then automatically relocate the scaled textual information and/or historical extractions to the unobstructed portion of the underlying second window. When the first and second windows no longer overlap, the textual information and/or historical extractions are returned to its original format and location, and un-scaled if needed.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompass 140ed by the present claims. Moreover, it is not necessary for a device or method to address each and every problem sought to be solved by the present disclosure, for it to be encompass 140ed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method known in the art.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VB Script, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

What is claimed is:

1. A method comprising:
   creating, by a processor, a database of a plurality of historical documents;
   creating, by the processor, cached metadata about the plurality of historical documents including regions of interest of objects, target data types, bag of words, identifier schema and known key-value pairs;
   storing, by the processor, the cached metadata about the plurality of historical documents in a relational database to increase computation speed;
   receiving, by the processor, a new document having second content and regions of interest;
   comparing, by the processor, the second content of the new document to first content in one or more of the plurality of historical documents;
   creating, by the processor, match metrics for each of the one or more of a plurality of historical documents, wherein the match metrics are based on a percentage of the second content that matches the first content;
   verifying, by the processor, the matching by comparing the match metrics across the plurality of historical documents;
   extracting, by the processor, the second content from the regions of interest in the new document based on the matching;
   checking, by the processor, the integrity of the second content in the new document against the first content in the one or more of a plurality of historical documents; and
   transmitting, by the processor, the second content to a document processing system,
   wherein the document processing system automatically further prepares tax documents using the second content.

2. The method of claim 1, wherein the comparing comprises comparing visual elements, textual elements, logos, fonts, lines and layouts.

3. The method of claim 1, wherein the comparing comprises:
   decomposing, by the processor, the first content and second content into features; and
   predicting, by the processor using machine learning, a similarity probability based on the features.

4. The method of claim 1, wherein the comparing comprises comparing text from headers, values and tables.

5. The method of claim 1, wherein the match metrics include a percentage overlap which comprises a number of words that are shared in the first content and the second content, divided by a total number of words between the first content and the second content.

6. The method of claim 1, further comprising determining, by the processor, a subset of the plurality of historical documents that includes a subset of the first content that matches a subset of the second content to reduce processing time and conserve processing resources.

7. The method of claim 1, wherein the comparing is accomplished by location un-aware OCR detected text and visual document similarity indexing.

8. The method of claim 1, wherein the comparing further comprises detecting, by the processor, raw text of the second content in the new document.

9. The method of claim 1, wherein the comparing further comprises detecting, by the processor, tables of the second content in the new document.

10. The method of claim 1, wherein the comparing further comprises pulling, by the processor, values, headers and text from raw text of the second content in the new document.

11. The method of claim 1, wherein the comparing further comprises pulling, by the processor, headers and text values from raw text of the second content in the new document, based on at least one of proximity or formatting.

12. The method of claim 1, wherein the comparing further comprises categorizing, by the processor, the second content similar to the first content.

13. The method of claim 1, wherein the comparing further comprises detecting, by the processor, tables of the first content in the historical document.

14. The method of claim 1, wherein the comparing further comprises pulling, by the processor, headers text values from raw text of the first content in the historical document.

15. The method of claim 1, wherein the comparing further comprises pulling, by the processor, at least one of headers or text values from raw text of the first content in the historical document, based on at least one of proximity or formatting.

16. The method of claim 1, wherein the comparing further comprises comparing, by the processor, visual elements between the new document and the historical document.

17. The method of claim 1, wherein the comparing further comprises comparing, by the processor, visual elements between the new document and the historical document using at least one of mean square error (MSE), a structural similarity index measure (SSIM) or an image similarity metric as determined by a deep neural network.

18. The method of claim 1, wherein the verifying is based on statistical properties of the match of the new document compared to population statistics of the plurality of historical documents.

19. The method of claim 1, wherein the comparing further comprises comparing at least one of text headers, text values, X-Y coordinate positioning or visual elements.

20. The method of claim 1, further comprising transmitting, by the processor, the new document with the second content to a human for verification, in response to the checking the integrity of the second content in the new document being a failure.

* * * * *